Aug. 26, 1969   S. LO RUBBIO ET AL   3,463,529
SAFETY LATCH CONTROL MEANS FOR AUTOMOBILE HOODS
Filed Jan. 11, 1968
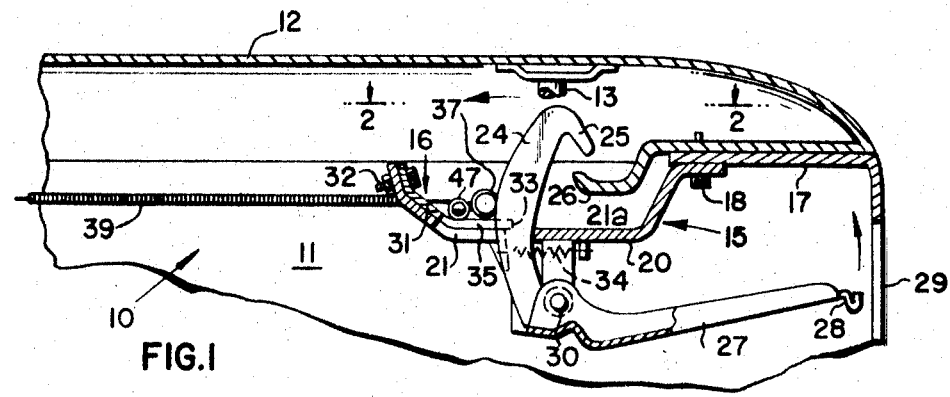
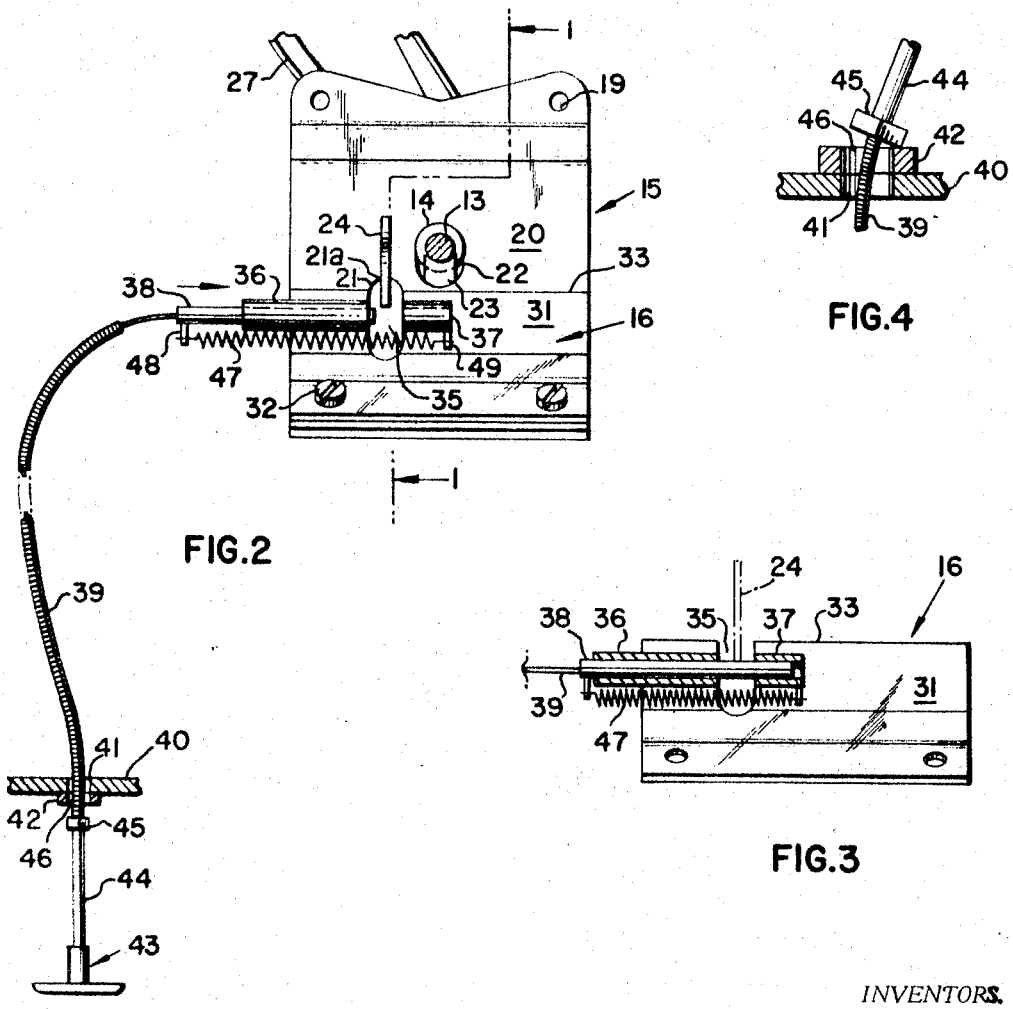
INVENTORS.
SALVATORE LO RUBBIO
CARMINE PAGLIARULO
BY  F. Federmann
ATTORNEY

United States Patent Office 3,463,529
Patented Aug. 26, 1969

3,463,529
SAFETY LATCH CONTROL MEANS FOR AUTOMOBILE HOODS
Salvatore Lo Rubbio, 1472 82nd St. 11228, and Carmine Pagliarulo, 2355 Ocean Ave. 11229, both of Brooklyn, N.Y.
Filed Jan. 11, 1968, Ser. No. 697,148
Int. Cl. E05c 19/10, 19/12
U.S. Cl. 292—106                5 Claims

ABSTRACT OF THE DISCLOSURE

Means operable extending into the driver's compartment, for unblocking the safety secondary latch to permit full raising of the hood cover after the primary latch has been released, thus preventing full lifting of the cover from outside a locked vehicle.

---

This invention relates to automobile hoods of the common alligator type, which usually have a combination of two sequentially actuatable and releasable latches both of which are pivoted to a manual lever accessible through the front grill. The first or primary latch consists of a grooved or headed stud or spear projecting downward from the forward portion of the cover and adapted to pass through an opening in a member rigid with a part of the vehicle frame while a spring biased tongue or the like below said member registers in the groove or behind the head of the stud to hold the cover tightly down. The second or secondary latch consists of an upstanding spring biased hook pivoted, like the said tongue, to the said lever and normally engaging a keeper or the like rigid with the cover. Upon actuation of the said manual lever, the tongue is first released from the stud whence the cover rises a very short distance at which it is stopped by the hook, and then the hook is released to permit the cover to be fully raised.

In this discussion, the direction in which the safety hook is moved or swung into engagement with its keeper will be considered the forward direction, so that it is swung into released position in a rearward direction. The present invention provides an obstruction to prevent release of the hook from the keeper, which obstruction is positioned directly behind the hook, together with means operable within the vehicle to move the obstruction into or out of blocking position with respect to the hook.

Referring briefly to the accompanying drawing:

FIG. 1 is in part a fragmentary vertical sectional view through the hood of an automobile and partly a sectional view taken on the line 1—1 of FIG. 2, with parts broken away and parts omitted.

FIG. 2 is partly a sectional view taken on the line 2—2 of FIG. 1, with parts broken away and parts omitted, and with additional parts including a fragment in section of the vehicle dashboard and means for actuating the hook obstructing bolt by the driver.

FIG. 3 is a top plan view of a plate per se added by the present invention showing the latch or hook obstructing bolt and, in section, the sleeves in which the bolt is slidable and further showing in phantom the safety hook blocked by the bolt.

FIG. 4 is an enlarged sectional view showing a feature of the dashboard control of the bolt.

Referring in detail to the drawing, the numeral 10 designates an alligator type of automobile hood made up of the fixed side and front wall portions 11 and the cover 12. Such covers, as is well known, are hinged at the rear on a transverse axis and are normally urged upward by springs, not shown. A stud 13 rigid with the cover 12 projects downward and is, in the example illustrated, provided with an enlarged head 14.

At 15 is shown a standard form of such a combination latching assembly which is secured along the front edge of its bedplate 20, to a stationary portion 17 of the vehicle hood, by means of screws or the like 18 passing through holes 19. The present invention mounts on the bedplate 20 the assembly 16, and adds additional means as set forth below.

The bedplate 20 has two oblong openings or slots 21 and 22, shown positioned substantially side by side, the former normally being longer and narrower than the latter. The slot 22 is so positioned that when the cover is closed down the stud 13 extends therethrough with the stud head 14 engaged by a tongue 23 to prevent release of the stud. The assembly 15 includes an upwardly extending hook 24 which passes through the slot 21 and has its tip 25 positioned just above a keeper 26 which is here shown, merely representatively, as an extension or portion of the cover 12. Thus, if the tongue 23 only is retracted to free the stud 23, the cover can rise only a short distance for it is stopped by the hook 24.

For operation of the standard assembly 15 is further included a release arm or lever 27 which is made accessible to manual operation by positioning its extremity 28 adjacent to the grill opening 29. Both the tongue 23 and the hook 24 are pivoted to the lever 27 on a pivot axis 30 and both are spring biased to swing into their latching positions. The standard construction, not shown in whole, is such, however, that the lever 27 is swung counter-clockwise, FIG. 1, to first withdraw the tongue 23 from the stud before continued swinging of the lever causes the hook 24 to be swung counter-clockwise to be disengaged from the keeper 26. Since such a standard construction is well known and is in use on Chevrolets and other General Motors models extending over a number of years including 1965, it has not been shown herein in whole. However, since the hook 24 is involved in the present invention, a spring 34 is shown in FIG. 1 to normally urge the hook clockwise into latching position.

The added assembly 16 is shown to consist of a substantially rectangular plate 31 which, in order to seat on the upwardly bent left-hand (FIG. 1) portion of the bedplate 20, is complementarily shaped and is attached in superimposed position thereon, transversely of the bedplate, by screws 32 or the like. The forward edge 33 of the added plate 31 terminates short of the forward extremity 21a of the slot 21 and rearward of the rear extremity of the slot 22. A cut-out or slot 35 is provided in the plate 31 through the said forward edge 33 and is aligned with the slot 21 as is seen in FIGS. 1 and 2.

Aligned sleeves 36, 37 are provided on the plate 31, either by welding them thereon or otherwise, at right angles to the slot 35, with their juxtaposed ends substantially superimposed on the opposed walls of this slot. The sleeve 36 is preferably longer than the sleeve 37 so that it may extend beyond the left-hand (FIG. 2) edge of the combined plates 20, 31. A bolt 38 is slidably mounted in the two sleeves. It is now apparent that when the hook 24 is in the latching position shown in FIG. 1 and the bolt has been moved from the position thereof in FIG. 2 to that shown in FIG. 3, the bolt blocks the hook from swinging to the left, FIG. 1. Hence, tilting lever 27 releases only the stud 13 to permit the cover to rise slightly while the hook 14 prevents its full opening.

In order to provide for actuating the bolt 38 from within the vehicle, the following additional means has been devised. A flexible cable, or Bowden wire, shown at 39, of a common and well known type, has one end attached to the outer end of the bolt while the other end of the cable extends through a hole 41 in the dashboard 40;

this hole may be circular. Attached to the dashboard is a washer-like member or grommet 42 provided with a hole 46 which is preferably non-circular, or square in outline. A key or button 43 includes a stem 44 which has a complementary non-circular or square end 45 whose maximum dimension normal to the stem is less than the maximum dimension of the hole 46. Thus the key 43 may be pushed home with the end 45 aligned with the hole 46 so that the end 45 may pass through the holes 46, 41 to push the bolt 38 across the gap between the sleeves 36, 37 and into the latter.

Upon pulling the key out to extract the bolt to release the hook 24, the stem may be twisted and shifted to engage a corner, for example, of the end 45 against the grommet 42 to prevent return of the stem to locking position of the bolt. This, of course, would be the case when the driver wishes to lift the hood, for he would first extract the bolt before stepping outside to tilt the lever 27.

In order to provide a more positive functioning of the bolt, both in pushing it into blocking position of the hook 24 and for maintaining it in extracted position, a tension spring 47 may be mounted between a lug 48 on the outer end of the sleeve 36 and a lug 49 on the, preferably, inner end of the sleeve 37.

We claim:

1. In a latching assembly for automobile hoods consisting of a primary latch normally holding the hood cover down in closed position and a secondary latch for holding the hood cover from fully opening upon release of the primary latch together with means accessible through the grill of the automobile for manual sequential release of said primary and secondary latches, said assembly including a bedplate attached to the vehicle frame and having a slot therein, said secondary latch consisting of a pivoted hook extending upward through said slot at approximately right angles to said bedplate and being spring biased normally to engage a keeper on the underside of said cover, the improvement consisting in two aligned sleeves attached to said bedplate in a line directly behind the normal position of said hook with one sleeve on each side of said slot, a bolt slidably mounted in both said sleeves and normally bridging the gap between them to block said hook against withdrawal from said keeper, and means for sliding said bolt out of one of said sleeves and clear of said gap to permit release of the hook from the keeper.

2. An improvement according to claim 1, said means for sliding said bolt comprising a flexible cable having one end thereof secured to one end of said bolt, the other end of said cable being slidably mounted in a hole in the dashboard of the vehicle, and a stem on the driver's side of the dashboard having one end thereof secured to said other end of said cable, said stem having a button thereon on the other end thereof.

3. An improvement according to claim 2, including a coiled spring having one end thereof secured to said one end of said bolt and the other end thereof secured to one of said sleeves.

4. An improvement according to claim 1, having an additional plate attached to said bedplate on that end thereof which is rearward of said hook, said additional plate having said aligned sleeves rigid therewith and having a slot therein superimposed upon said first-named slot.

5. An improvement according to claim 3, a grommet surrounding said hole in the dashboard, said one end of said stem having a cross-sectional area smaller than the passage through said grommet and larger than the cross-sectional area of said cable.

References Cited

UNITED STATES PATENTS

| 2,145,968 | 2/1939 | Bozarth | 292—171 |
| 2,193,132 | 3/1940 | Hynes | 292—11 |
| 2,199,467 | 5/1940 | Saunders | 292—48 |
| 2,779,615 | 1/1957 | Kaiser | 292—221 |
| 2,809,064 | 10/1957 | Dlugatch | 292—226 |
| 2,841,430 | 7/1958 | Krause | 292—11 |

DAVID J. WILLIAMOWSKY, Primary Examiner

J. KARL BELL, Assistant Examiner

U.S. Cl. X.R.

292—11